US005558921A

United States Patent [19]

Pavlik

[11] Patent Number: 5,558,921

[45] Date of Patent: Sep. 24, 1996

[54] NOTE WRITER'S FRUGAL AID

[76] Inventor: John P. Pavlik, 20411 Lassen St., Chatsworth, Calif. 91311

[21] Appl. No.: 13,322

[22] Filed: Feb. 4, 1993

[51] Int. Cl.$^6$ ........................................ B32B 3/04

[52] U.S. Cl. ........................ 428/121; 206/38; 206/214; 206/224; 206/371; 206/805; 248/174; 428/124; 428/130; 428/220

[58] Field of Search ........................ 428/121, 124, 428/130, 220; 248/174; 206/214, 224, 38, 805, 371

*Primary Examiner*—Nasser Ahmad

[57] ABSTRACT

A paper-saving, trash-decreasing device for utilizing used standard-sized envelopes as either rigid, hand-held portable writing-paper or as rigid writing-paper stabilized on a desk-top by weight of the writing arm, said device being a stiff sheet sized to fit all the way into a standard-sized flap-sealed, one-end opened envelope and project therefrom, having projection affixed with a resilient friction pad positioned to contact the desk surface. This device has further paper-saving, trash-decreasing utility when it is attached by flexible bands to the hard back of a standard note-pad so that when the note-pad is placed on a desk, hard-back down, the resilient friction-pad of this device will be in contact with the desk top so as to stabilize the note-pad even when it is written on near its bottom edge. The note-pad, so mounted on this device, can be held in one hand with the device projecting below the bottom edge of the note-pad, so that the pad can be fully utilized by writing with the other hand down to its bottom edge while the writing wrist is resting on the projecting device. In both modes of use this device can simultaneousely be used to securely but removeably hold a writing instrument in readiness for immediate use.

4 Claims, 1 Drawing Sheet

NOTE WRITER'S FRUGAL AID

BACKGROUND OF THE INVENTION

The numerous envelopes received in mail and discarded by commercial, industrial and domestic addressees have backsides and partial frontsides suitable for writing. A device that facilitates the use of this writing space would help conserve our paper supply and lessen our trash disposal problem. There is need for note-paper that will not slip on a desk-top under the writing hand of a person whose other hand is holding a phone and, when so stabilized, will allow full use of the paper down to the bottom.

There is need for stiffly-backed portable note-paper that can be fully utilized while the writer is standing, sitting away from a deak or lying in bed.

SUMMARY OF THE INVENTION

The instant invention comprises an elongate length of cardboard sized in width to fit into a standard sized flap-sealed, one-end opened envelope and sized in length so that upon being transversely folded into a first, long, fold member and a second, short, fold member, upon the fold corners being truncated, and upon being inserted, fold-first, all the way, into the envelope the first, long, fold member projects about 1" out of the envelope and the second, short, fold member projects about ¼".

On the surface facing the second, short, fold member, the terminal ½" of the first, long, fold member is affixed with a resilient, foam rubber friction pad.

A so-stuffed and stiffened envelope can be held in one hand while being written on with the other. The envelope can also be placed on a desk, foam rubber down and in contact with the desk, so that a writer's arm will rest over the foam rubber when writing at the closed end of the envelope. By holding a closed-end corner of the envelope with one hand the device can be pulled out about ⅔ with the other hand to facilitate writing all the way down to the open end of the envelope.

A writing instrument can be conveniently carried by inserting it between the fold members and in contact with the foam rubber.

Both extra and already utilized envelopes can be stored between the fold members after the envelopes are folded transversely.

For paper-saving use with a common writing pad the invention includes two rubber bands spaced apart and transversely bound around the two fold members so as to hold them together. The hard back of the note pad can be slipped between the bands and the short fold member of the invention, resulting in the folded end and the fold members being between the hard back and the bottom sheet of the note-pad and the foam rubber extending below the bottom edge of the pad.

The so-coupled note-pad and invention can be held in one hand while the note pad is fully utilized by writing down to the bottom edge of the pad with the other hand which is supported by the projection of the device.

The so coupled note-pad and invention can be placed on a desk, hard-back and foam rubber down, in contact with the desk, so as to be stabilized by the weight of the writing arm as the note-pad sheet is fully utilized from top to bottom.

One object of this invention is to save paper.

Another object of this invention is to decrease the volume of waste paper that is being generated.

Another object of this invention is to provide free writing paper that can be stabilized on a desk surface.

Another object of this invention is to provide free portable, hand-held, rigidly-backed writing paper.

Another object of this invention is to provide free writing paper in proximity to a writing instrument.

Another object of this invention is to provide free writing paper stored for convenient use and conveniently stored after use.

Another object of this invention is to stabilize a common note-pad on a desk surface.

Another object of this invention is to facilitate hand-held use of a common note-pad.

Another object of this invention is to provide a means of holding a writing instrument in removeable attachment, in proximity to a fully utilizeable, stabilized note-pad.

DESCRIPTION OF THE PREFERRED EMBODIMENT

For a better understanding of the instant invention reference is made to the following description taken in connection with the accompanying drawings and its scope will be pointed out in the appended claims.

Figure 1:
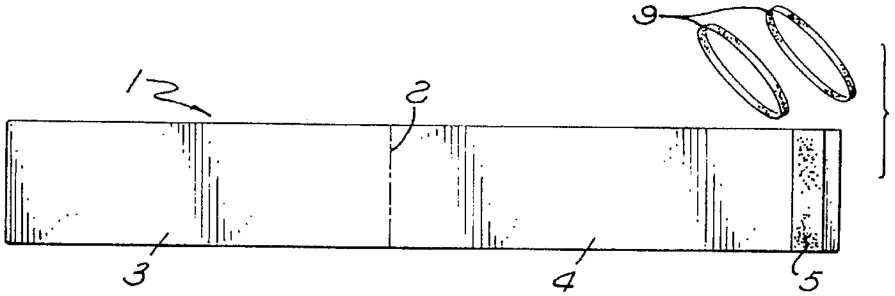
FIG. 1 is a top plan view showing all of the components of the instant invention—an elongate rigid sheet marked where it is to be folded and a friction pad affixed to the end of what will become the longer of the two fold members, elastic bands.
Figure 2:
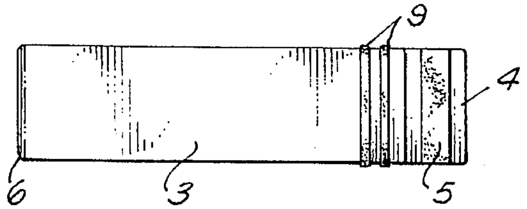
FIG. 2 is a top plan view showing all of the components of the invention after the rigid sheet has been folded on the mark shown in FIG. 1. Also shown is the result of truncating the two corners formed by the fold.
Figure 3:
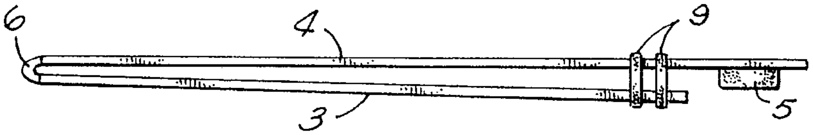
FIG. 3 is a side view of FIG. 2.
Figure 4:
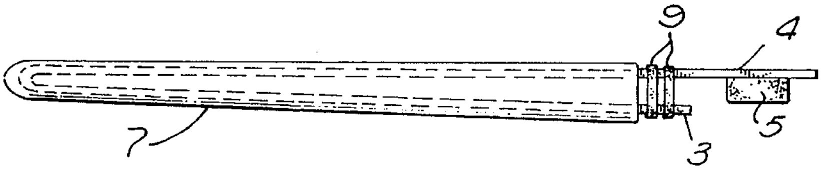
FIG. 4 shows the invention, as shown in FIG. 3, inserted all the way into a flap-closed, end-opened envelope.
Figure 5:
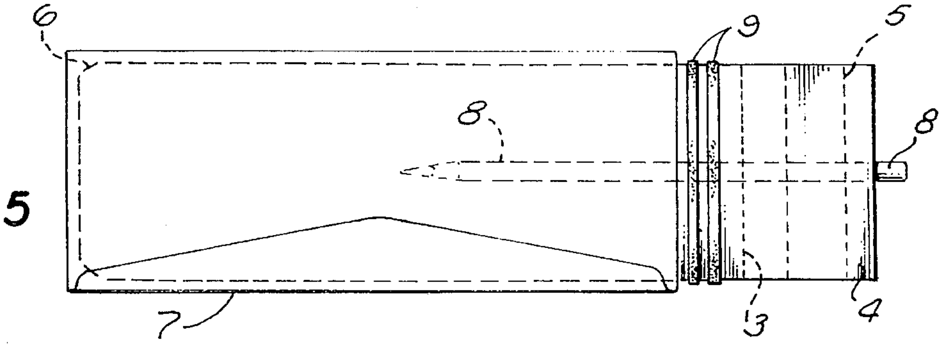
FIG. 5 is a top plan view of all of the components of the invention inserted into an envelope as shown in FIG. 4 and additionally shows the invention holding a writing instrument.

A sheet of thick cardboard of the common shoe-box variety 1 of FIG. 1 is sized to 3<sup>15</sup>⁄16"×20⅛" and is affixed, by means of glue, with a ⅜" wide, 3<sup>15</sup>⁄16" long and ⅜" thick foam-rubber pad 5 of FIG. 1 along one end. 10½" from the pad-affixed end a transverse line 2 of FIG. 1 is drawn and the sheet is folded on this line so that the line is within this fold; a short fold member 3 of FIGS. 1, 2 9⅝" long and a long fold member 4 of FIGS. 1, 2 10½" long are formed. Since the fold member 4 of FIGS. 1, 2 that is affixed with the foam rubber pad 5 of FIGS. 1, 2 is longer than the other fold member 3 of FIGS. 1, 2 the foam rubber pad 5 of FIGS. 2, 3, 4 will not contact shorter fold member 3 of FIGS. 2, 3, 4 even in a close, tight fold. Each of the two corners created by the fold is truncated with equal length cuts by cutting through both fold members so as to decrease the length of the fold 1" and each long side by ½", 6 of FIG. 2. Two rubber bands 9 of FIGS. 1, 2 are bound around folds 3,4. By inserting the thus formed invention, truncated corners 6 of FIGS. 2, 3 first, all the way into a standard sized 4⅛×9½" flap-sealed, end-opened envelope 7 of FIGS. 4, 5 so that the long fold-member 4 of FIGS. 4, 5 is in contact with the flap side of the envelope, the foam rubber pad will extend out of the envelope. The invention-envelope assembly can now be placed on a desk, flap side up, foam rubber pad down, so as to provide the flap side of the envelope as a writing surface that is stabilized by the weight of the writing forearm pressing the foam rubber pad down onto the desk surface. The envelope will remain effectively stabilized even when the invention is pulled almost all of the way out to facilitate writing down to the bottom, open end, of the envelope.

The envelope-invention assembly can be held in one hand while writing on the envelope with the other hand braced on the extending end of the invention which can be gradually pulled out as the writing progresses toward the open end of the envelope.

The truncated fold corners not only facilitate insertion of the invention into an envelope but serve to leave voids in the closed-end corners of the envelope, whereby one of these envelope corners can be tightly held without pressing on the enclosed invention while the invention is being pulled out of the envelope.

The space between the two fold members provides a convenient storage space for folded envelopes for future use and for written-upon envelopes that are to be kept.

Figure 6:
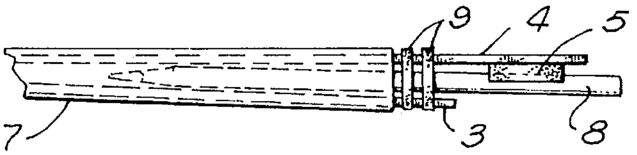
FIG. 6 shows a side view of FIG. 5 as it would be with the folded end of the invention and the closed end of the envelope cut away.

The relative positions of the folds 3,4 of FIGS. 4, 5, 6 and the foam rubber pad 5 of FIGS. 4, 5, 6 provide containment and friction adequate to hold a pen or pencil 8 of FIG. 6 securely but removeably when it is partially inserted between the folds so that its projecting end is in contact with the foam rubber pad.

Figure 7:
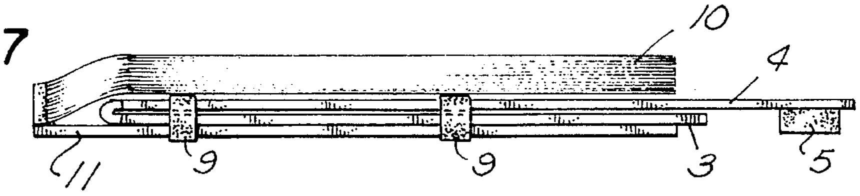
FIG. 7 is a side view of the invention showing a common note-pad in attachment thereto with bands.

Another use of the instant invention is made FIG. 7 by usin two rubber bands 9 of FIG. 7 of the above described embodiment. The rubber bands 9 of FIG. 7 are spaced apart and bound transversely around the two fold members 3,4, of FIG. 7 so that the hard back 11 of FIG. 7 of a common note-pad 10 of FIG. 7 can be slipped between the bands 9 of FIG. 7 and the short fold of the invention 3 of FIG. 7 so that the fold end of the invention is between the hard back 11 of FIG. 7 and the bottom sheet of the note pad 10 of FIG. 7; the foam rubber affixed end is projecting beyond the bottom edge of the note pad. So coupled by the two rubber bands, the note pad and invention assembly shown in FIG. 7 can be held in one hand while the pad is being written on down to its lower edge by the other hand that is braced on the projecting invention; the assembly can also be placed on a desk, hard-back 11 and foam rubber pad 5 of FIG. 7 facing down so as to produce a writing pad stabilized under the weight of the writing forearm so that it can be utilized down to the bottom edge.

The rubber-band-bound fold members 3,4 of FIG. 7 and the foam rubber friction pad 5 of FIG. 7 are in an alignment that will securely but removeably hold a writing instrument by friction when it is partially inserted between the folds 3,4 of FIG. 7 which are flexibly bound by the rubber-bands 9 of FIG. 7 so that its projecting end is in contact with the friction pad 5 of FIG. 7.

What is claimed is:

1. A note taking device that holds a writing instrument next to writing paper, provides storage for and use of envelopes as said writing paper or facilitates the use of a note pad as said writing paper, said device comprising: an elongate cardboard sheet of 3¹⁵⁄₁₆ width and having a transverse fold resulting in a first, long, fold member and a second, short, fold member connected to each other at the folded end, each of said fold members being essentially rectangular and the long fold member is folded over the short fold member such that said long fold member extends over and beyond the unconnected end of said short fold member, said fold members have both fold corners truncated and both fold members being bound together by more than one transversely positioned elastic rubber band, a resilient foam-rubber friction pad is affixed onto said long fold member along its unconnected end on the surface that faces and extends beyond the short fold member, such that insertion of the device, truncate corners first, into a flap-sealed, one-open-end envelope modifies the envelope into a backed writing surface that can either be hand-held or stabilized when the envelope-invention assembly is placed on a desk, extended resilient pad down, so that a writing arm rests over the resilient pad, such that the elastic bands can be spaced apart to receive and hold the hard back of a common note-pad when it is slipped between the bands and the second, short, fold member so that the connected end of the fold members is between the hard back and the bottom sheet of the note-pad, so that the note-pad can be held in one hand and utilized down to the bottom edge while the writing arm is resting on the projecting fold members, such that the so-coupled note-pad and the invention assembly can be placed on a desk, resilient pad down, so that the weight of a writing arm over the resilient pad stabilizes the note-pad while it is being utilized from the top to the bottom, whereby, in both applications, the invention can securely but removably hold a writing instrument partially inserted between the two fold members so that its projecting end is in contact with the resilient pad, transversely-folded envelopes for future use and already invention-utilized paper can be stored between the folds.

2. A device as described in claim 1 wherein said sheet is sized to approximately 20⅛" long, the fold members are approximately 9⅝" and 10½" long, the resilient pad is a rectangular foam rubber pad approximately 3¹⁵⁄₁₆"×⅜"×⅜" thick, the truncated length corners are formed by equal length cuts at each fold corner so as to reduce each fold member long side by ½" and reduce the side formed by the fold by 1" such that the invention will fit into a standard size 4⅛"×10½" flap-sealed, one-end-open envelope and extend from the open end, such that the 3¹⁵⁄₁₆" width and overall 10½" length of the device are adequate to hold a standard size 3½"×8⅜" common hard back note-pad and extend beyond its lower edge.

3. A device as described in claim 2 wherein the surfaces of the fold members are suitable for imprinting with indicia.

4. A device as described in claim 3 wherein the fold members are imprinted with ornamentation, advertisement and indicia such as writing lines, first-aid instructions, a calender, sport schedules and recipes.

* * * * *